United States Patent

Takagi

[19]

[11] Patent Number: 5,902,204
[45] Date of Patent: May 11, 1999

[54] CIRCUIT FOR CONTROLLING A HYDRAULIC PRESSURE OF AN AUTOMATIC TRANSMISSION

[75] Inventor: Kiyoharu Takagi, Okazaki, Japan

[73] Assignee: Aisin Seiki Kabushiki Kaisha, Kariya, Japan

[21] Appl. No.: 08/743,183

[22] Filed: Nov. 5, 1996

[30] Foreign Application Priority Data

Nov. 6, 1995 [JP] Japan ..................................... 7-287520

[51] Int. Cl.$^6$ ....................................................... F16H 5/64
[52] U.S. Cl. ........................ 475/122; 475/116; 475/120
[58] Field of Search .................................. 475/116, 118, 475/120, 121, 122, 127, 128

[56] References Cited

U.S. PATENT DOCUMENTS

| | | |
|---|---|---|
| 3,754,482 | 8/1973 | Sanders et al. . |
| 4,538,482 | 9/1985 | Hiramatsu ................................ 477/155 |
| 4,754,403 | 6/1988 | Hiramatsu ........................... 475/120 X |
| 5,154,100 | 10/1992 | Yamada et al. ...................... 477/154 X |
| 5,311,795 | 5/1994 | Yoshimura et al. ..................... 475/123 |
| 5,411,446 | 5/1995 | Hirose ................................. 475/128 X |
| 5,582,559 | 12/1996 | Jang et al. ........................... 477/127 X |
| 5,634,865 | 6/1997 | Jang ................................... 475/128 X |

FOREIGN PATENT DOCUMENTS 63-210443 9/1988 Japan .

*Primary Examiner*—Dirk Wright
*Assistant Examiner*—Peter T. Kwon
*Attorney, Agent, or Firm*—Burns, Doane, Swecker & Mathis, LLP

[57] ABSTRACT

A circuit for controlling hydraulic pressure of an automatic transmission includes a first shift device, a second shift device and a third shift device which make line pressure lead-through by selecting the predetermined combination of supply and exhaust of hydraulic pressure in accordance with the transmission stage in order to set the transmission stage of the automatic transmission in response to the driving condition of the vehicle. A switching device detects that a hydraulic pressure is supplied to an output line of the first shift device or an output line of the third shift device so that the third-speed and the fourth-speed are switched. The switching device also detects that the hydraulic pressure is supplied to an output line of the second shift device and an output line of the third shift device so as to shut out a line which is conducted to one of engaging elements being engaged at each time of the first-speed and the third-speed. By switching the combination of the supply and exhaust of hydraulic pressure, among devices which set each of the transmission stages, the number of parts and the required space can be reduced by shutting out the switching valves of line pressure.

4 Claims, 3 Drawing Sheets

CIRCUIT FOR CONTROLLING A HYDRAULIC PRESSURE OF AN AUTOMATIC TRANSMISSION

FIELD OF THE INVENTION

The present invention relates to an improvement in a circuit for controlling a hydraulic pressure of an automatic transmission as follows. This circuit corresponds a logical driving signal defined in response to the driving condition of the vehicle to the supply and exhaust of the hydraulic pressure in order to set each of gear ratios of planetary device so that a plurality of electric shift devices are operated and shift operation thereof is conducted by the driving signal.

DESCRIPTION OF THE PRIOR ART

In general, the circuit for controlling a hydraulic pressure of an automatic transmission includes a plurality of shift devices which change the transmission stage of the planetary device as for low-second-speed shift, as for second-third-speed shift and as for third-fourth-speed shift.

However, in this kind of transmission, it is necessary to prevent transmission shock by changing the hydraulic pressure in response to the operation of one way clutch of the transmission and an accumulator; and the variation of the throttle so that a lot kinds of valves are necessary.

As described in U.S. Pat. No. 3,754,482 and Japanese Unexamined Patent Publication (KOKAI) No. 210443/1988, there are provided a group of shift devices driven by electrically logical signal outputted in response to the driving condition of the vehicle: by changing the combination of the supply and exhaust condition of the hydraulic pressure in a line to each of engaging elements such as a clutch, a brake and so on, each of transmission stages are effected.

In these circuits for controlling a hydraulic pressure electrically, the electrically logical signal is outputted based on a transmission line which was predetermined by electronic controls. Each of shift devices are driven at the timing in which the transmission shock is decreased as possible in response to the driving condition. And it is not necessary to provide a one way clutch, throttle valve and modulator valve in the automatic transmission; so that the circuit for controlling a hydraulic pressure of space saving is realized.

Anyway, in the above-mentioned circuit for controlling a hydraulic pressure, in order to prevent more than three engaging elements from engaging at the same time even the group of shift devices malfunction, it is necessary to provide a valve for fail safe. However in the circuit for controlling hydraulic pressure described in Japanese Unexamined Patent Publication (KOKAI) No. 210443/1988, except for a valve for preventing the above-mentioned malfunction, a valve for switching the line pressure is needed; accordingly, a irreducible minimum construction of a demand, that is, a construction including a valve as a means for switching a group of shift devices and for fail safe and so on, is not realized there.

SUMMARY OF THE INVENTION

The present invention has been developed in view of the above-mentioned problems found in the prior art. Therefore, the object of the present invention is to provide a technique for controlling a shift operation as follows. By using a circuit for controlling a hydraulic pressure having a group of shift devices which switches supply and exhaust of a hydraulic pressure of a line in response to the driving condition of the vehicle, in which shift operation can be operated only by a group of shift devices and switching means so that a number of parts can be reduced and the construction thereof is simple and space-saving.

The point of the invention which solves the above-mentioned problems is as follows: (a) the first shift device, the second shift device and the third shift device which make line pressure lead-through by selecting the desired combination of supply and exhaust of hydraulic pressure in accordance with transmission stage in order to set the transmission stage of an automatic transmission in response to the driving condition of the vehicle; and (b) a switching means which detects that a hydraulic pressure is supplied to an output line of the first shift device or an output line of the third shift device so as to switch third-speed and fourth-speed or fourth-speed to third-speed, and which detects that the hydraulic pressure is supplied to an output line of the second shift device or an output line of the third shift device so as to shut out a line which is conducted to the one of engaging elements being engaged at each time of first-speed and third-speed.

As mentioned above, according to the present invention, a switching means detects that a hydraulic pressure is supplied to the output line of the first shift device or the output line of the third shift device so that third-speed and fourth-speed are switched. It also detects that the hydraulic pressure is supplied to the output line of the second shift device and the output line of the third shift device so that the shutout of the line conducted to the one of engaging elements being engaged at each time of first-speed and third-speed. In other words, additional valves for driving the switching means are not necessary, the switching means is driven only by the output line of the group of shift devices. So that it is possible to control the automatic transmission only by the simple construction composed of the group of shift devices and the switching means. Therefore, the number of parts can be greatly reduced and the present invention can intend to reduce space and cost thereof.

Especially, as a controlling method in which there is provided a shift device for an ordinary low-second-speed shift, second-third-speed shift and third-fourth-speed shift, besides the adjustment in diameter of orifice and spring load, the adjustment of structural parameter of accumulator capacity and so on, these kinds of specific control can be replaced with a software of control computer in the present invention.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which form a part of the disclosure.

DETAILED DESCRIPTION OF THE PREFERRED EMBODIMENT

Having generally described the present invention, a further understanding can be obtained by reference to the specific preferred embodiments which are provided herein for purposes of illustration only and are not intended to limit the scope of the appended claims.

Hereinafter, the circuit for controlling a hydraulic pressure of an automatic transmission according to the present invention will be explained definitely by reference to figures.

Figure 1:
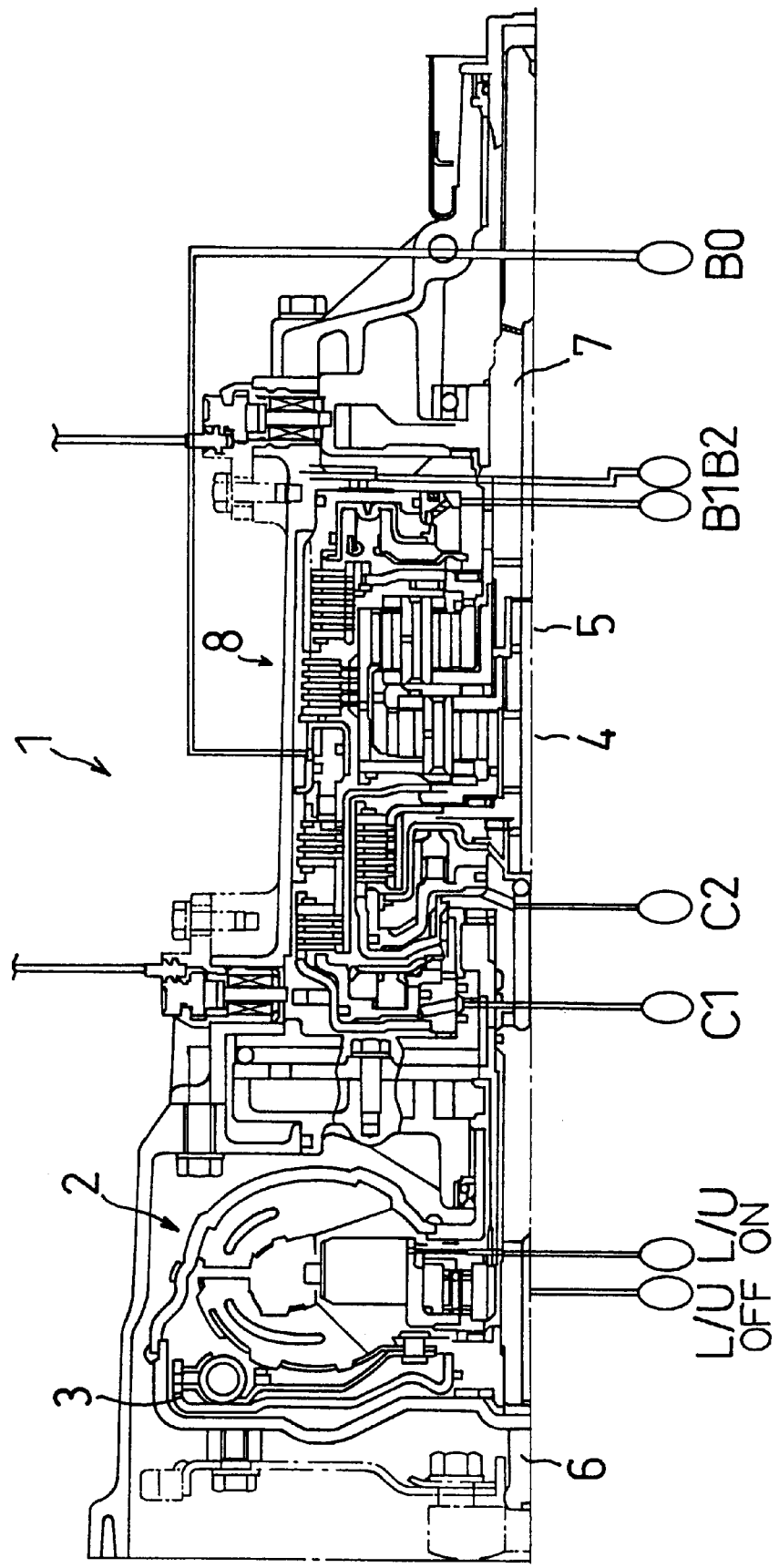
FIG. 1 is an explanatory figure showing on example of an automatic transmission to which a circuit for controlling a hydraulic pressure of an automatic transmission of the present invention can be applied.

In the circuit for controlling a hydraulic pressure of an automatic transmission according to one preferred embodiment of the present invention, an automatic transmission 1, as shown in FIG. 1, comprises: an input shaft 6 which is connected to an output shaft of an engine; a torque converter 2 having a lock-up clutch 3; and an auxiliary transmission mechanism 8 which is mainly composed of two planetary devices 4 and 5 which are provided between the above-mentioned input shaft 6 and output shaft 7 and engaging elements C1, C2, B0, B1 and B2.

Figure 2:
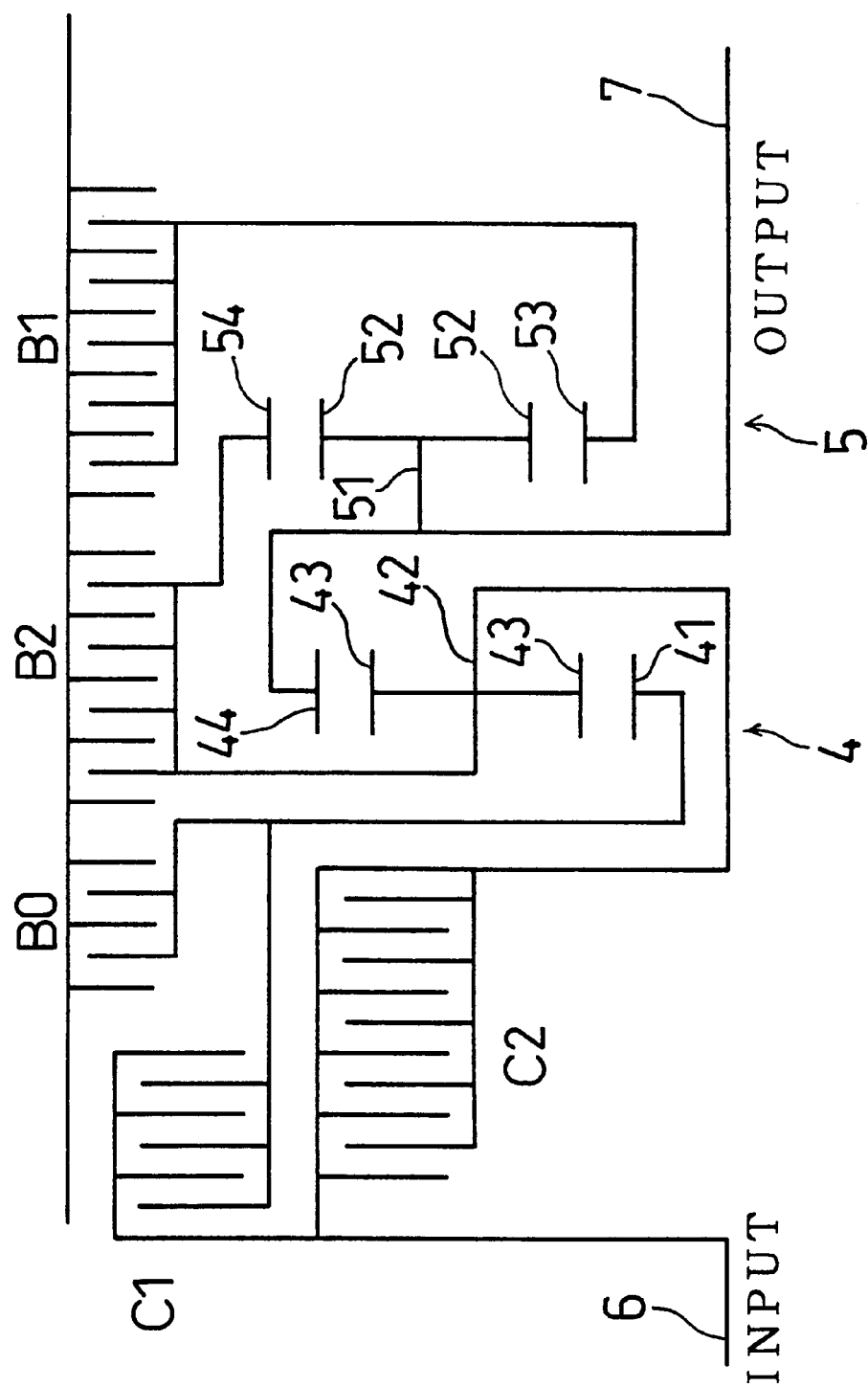
FIG. 2 is a skeleton figure of a auxiliary gear mechanism of the above-mentioned automatic transmission.

In the auxiliary transmission mechanism 8, being explained by reference to FIG. 2, the above-mentioned input shaft 6 is connected to a sun gear 41 of the first planetary device 4 through a clutch C1; and at the same time, the input shaft 6 is connected to a carrier 42 of the first planetary device 4 through a clutch C2. A pinion 43 maintained by a carrier 42 is engaged between the sun gear 41 and a ring gear 44. Also, while the sun gear 41 is fixed selectively to a housing through a brake B0, a carrier 42 is selectively fixed to a housing through a brake B2 in the same way.

A carrier 51 of the second planetary device 5 is connected to the ring gear 44 of the first planetary device 4 and at the same time, the output shaft 7 is connected to the ring gear 44. A pinion 52 of the second planetary device 5 is engaged between a sun gear 53 and a ring gear 54. Also, while the sun gear 53 is fixed selectively to a housing through a brake B1, a ring gear 54 is selectively fixed to a housing through the brake B2 in the same way.

In the above-mentioned auxiliary transmission mechanism 8, as shown in Table 1, in the state in which the clutch C1 and the brake B1 are engaged, the sun gear 53 of the second planetary device 5 is fixed so that the driving force of the input shaft 6 is transmitted to: the sun gear 41, the pinion 43 and the ring gear 44 of the first planetary device 4; the pinion 52 and the ring gear 54 of the second planetary device 5; and then first-speed is realized.

Also, in the state in which the clutch C2 and the brake B1 are engaged, the input shaft 6 is connected to the pinion 43 of the first planetary device 4 so that the sun gear 41, the ring gear 44, the pinion 52 and the ring gear 54 of the second planetary device 5 are moved, and second-speed is realized.

In the state in which the clutches C2 and C2 are engaged, third-speed is realized by the sun gear 41, the pinion 43 and the ring gear 44 of the first planetary device 4.

Furthermore, in the state in which the clutch C1 and the brake B0 are engaged, the sun gear 41 of the first planetary device 4 is fixed so that fourth-speed is realized by the pinion 43, the ring gear 44 and the second planetary device 5.

TABLE 1

| | | CLUTCH/ BRAKE OPEATION TABLE | | | | | SOLENOID VALVE OPERATION TABLE | | |
|---|---|---|---|---|---|---|---|---|---|
| | | C1 | C2 | B0 | B1 | B2 | SV1 | SV2 | SV3 |
| D | 1 | o | | | o | | x | o | o |
| | 2 | | o | | o | | o | x | o |
| | 3 | o | o | | | | x | x | x |
| | 4 | o | o | | | | o | x | x |

Figure 3:
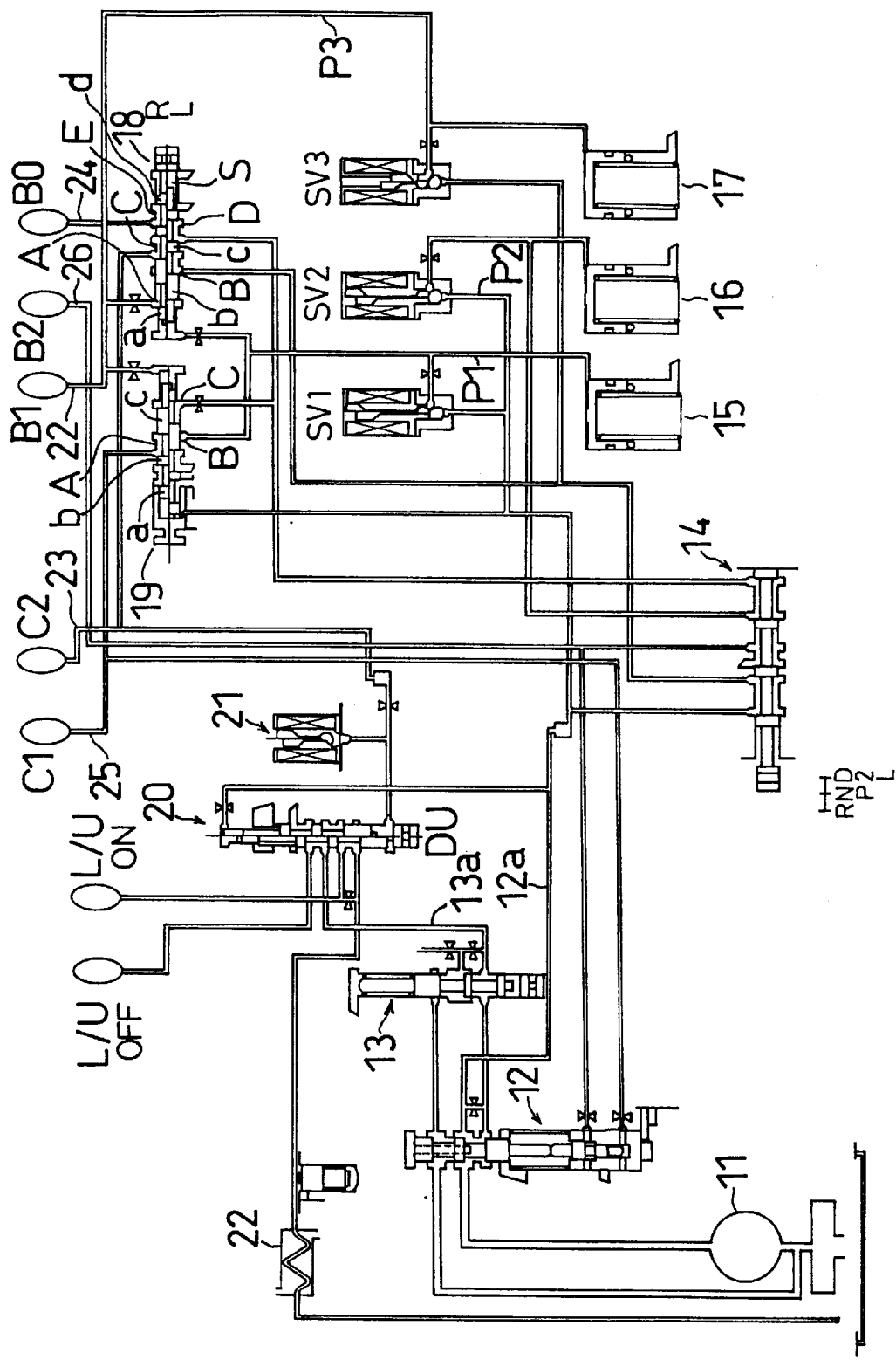
FIG. 3 is a construction figure showing one example of a circuit for controlling a hydraulic pressure of an automatic transmission of the present invention.

Next, as shown in FIG. 3, the circuit for controlling a hydraulic pressure which controls the automatic transmission 1 comprises: a primary regulator 12 which leads-through the hydraulic pressure generated by a pump 11 as a line pressure 12a; secondary regulator 13 which leads-through a converter hydraulic pressure 13a from the primary regulator 12 to the onverter; solenoid valves SV1, SV2 and SV3 (the first shift device, the second shift device and the third shift device) which switch the supply and exhaust of the line pressure 12a to each of cluthces C1 and C2 and brakes B0 and B1 in response to the driving condition of the vehicle and which lead-through it to the output line thereof; an overdrive select valve 18 of spool-type and auxiliary valve 19 in which the line pressures P1 to P3. whose combination of supply and exhaust is set by these solenoid valve SV1 to SV3, are supplied at the predetermined point and which conducts the shift for valve operation; and a manual valve 14 which switches the supply and exhaust of the line pressure 12a to the solenoid valve SV3 by operated manually and at the same time, which switches the supply and exhaust of the line pressure P1 and B2 from the solenoid valves SV1 and SV2 to the above-mentioned overdrive select valve 18 and the auxiliary valve 19. The switching means of the present invention is realized by the above-mentioned overdrive select valve 18 and the auxiliary valve 19.

In this way, the spool of the above-mentioned overdrive select valve 18 comprises land a and lands b to d in order all of which construct left pressure chamber. And a cylinder comprises a port of the left pressure chamber and ports A to E in the middle thereof; and the force of spring S is acted on the land d. The land b switches the communication and shutout between the ports C and B; and the land c switches the communication and shutout between the ports E and D. If the port E is shut out from the port D, it gets into the exhaust state.

And, a line 22 into a brake B1 is connected to the port A of the above-mentioned overdrive select valve 18; a line 23 into a clutch C2 is connected to the port C of the overdrive select valve 18; and a line 24 into a brake B0 is connected to the port E of the overdrive select valve 18.

The spool of the auxiliary valve 19 comprises land a and lands b and c in order all of which construct left pressure chamber; and a cylinder comprises ports A to C in the middle thereof; and each of them comprise a port of the left pressure chamber and a port of a right pressure chamber respectively. The land c switches the communication and shutout between the ports A and B; and if the port A is shut out from the port B, it gets into the exhaust state.

And, a line 25 into a clutch C1 is connected to the port A of the above-mentioned auxiliary valve 19; and a line 22 into a brake B1 is connected to the port of the right pressure chamber of the auxiliary valve 19.

A line pressure 12a is directly supplied to each of input lines of the above-mentioned solenoid valves SV1 and SV2.

The output line of the solenoid valve SV1 is connected to the port of the left pressure chamber of the overdrive select valve 18 and to the port B of the auxiliary valve 19. The output line of the solenoid valve SV2 is connected to the port D of the overdrive select valve 18 through the manual valve 14 and at the same time, it is connected to the port C of the auxiliary valve 19.

A line pressure 12a is supplied to the input line of the above-mentioned solenoid valve SV3 through the manual valve 14. The output line of the solenoid valve SV3 is connected to the line 22 of the brake B1 and at the same time, it is connected to the port of the right pressure chamber at the port A of the overdrive valve 18 and the auxiliary valve 19.

Accumulators 15 to 17, which buffer each of sudden changes of the hydraulic pressures, are connected to the output lines of the solenoid valves SV1 to SV3 respectively.

Also, the solenoid valves SV1 and SV2 are three-way normal open type electromagnetic valves; and the solenoid valve SV3 is a three-way normal close type electromagnetic valve.

Furthermore, the line pressure from a primary regulator 12 is supplied to a line 26 of the brake B2 at the time of R range.

On the other hand, a converter hydraulic pressure 13a which is led through from the secondary regulator 13 is supplied to an output port of the torque converter 2 by moving a spool of L/U control valve 20 on the figure to the lower side position (D) when the lock-up clutch 3 is disengaged (OFF) under the switching operation of a lock-up (L/U) control valve 20 driven by the control solenoid valve 21; and the return oil thereof is returned to the oil pan passing the L/U control valve 20 through a cooler 22 in the same way. When the lock-up clutch 3 is ON, the converter hydraulic pressure 13a is not supplied to the torque converter 2 by moving the spool of the L/U control valve 20 to the upper side position (U) caused by a hydraulic pressure based on line pressures P1 and P2 which appear at the output line of solenoid valve SV1 or SV2.

(1) operation at the time of first-speed

The solenoid valve SV3 is in the state of being energized (ON), therefore, a line pressure P3 is lead-through to the output line, and the brake B1 is supplied to the line 22. Owing to this, the brake B1 is engaged. Also the spool of the overdrive select valve 18 in which the port A is connected to the output line of the solenoid valve SV3 is moved to the right direction (R) because a land b is pressed by the line pressure P3. Accordingly, the line 24 to the brake B0 get in the exhaust state (disengagement of brake B0) by disengaging the port E by the land d.

By the communication of the port C and the port D, the output line of the solenoid valve SV2 is communicated to the line 23 of the clutch C2 through the manual valve 14; and the output line of the solenoid valve SV2 is in the exhaust sate; Owing to these the clutch C2 is disengaged (because solenoid valve SV2 is in the ON state and the line pressure 12a is not led through to the output line)

In the auxiliary valve 19 in which the port of the right pressure chamber is connected to the output line of the solenoid valve SV3, the spool thereof is intended to be moved to the left direction by the line pressure P3; however because the output line of the solenoid valve SV2 is in the exhaust state, the port C through the manual valve 14 also gets in the exhaust state, the force of the left direction is not acted on the land c. Therefore, it is defeated by the left pressure chamber to which the line pressure 12a is supplied so that it is moved to the right direction. Owing to this, the land c communicates the port A and port B; the line pressure P1 is supplied from the output line of the solenoid valve SV1 to the line 25 to the clutch C1; the clutch C1 is engaged (because solenoid valve SV1 is in the OFF state and the line pressure P1 is led-through to the output line).

Based on the above-mentioned operation, the clutch C1 and the brake B1 are operated so that first-speed state is realized.

(2) operation at the time of second-speed

The solenoid valve SV3 is in the ON state, therefore, the line pressure P3 which appears at the output line is supplied to the brake B1 (brake B1 is engaged). Also, by the line pressure P3, the spool of the overdrive select valve 18 is moved to the right direction. Therefore, the port E of the overdrive select valve 18, as in the same way as that in the first-speed time, gets in the exhaust state so that the line 24 to the brake B0 is exhausted.

By the communication of the port C and the port D, the line pressure P2 from the output line of the solenoid valve SV2 is supplied to the line 23 to the clutch C2 through the manual valve 14 so that the clutch C2 is engaged (because the solenoid valve SV2 is in the OFF state and the line pressure P2 is led through to the output line).

To the auxiliary valve 19, the line pressure P3 to the port of the right pressure chamber is supplied and at the same time, the line pressure P2 from the output line of the solenoid valve SV2 is supplied to the port C. Therefore, the land C is pressed to the left direction by the above-mentioned line pressure P2 and it overcomes the line pressure 12a which is supplied to the port of the left pressure chamber so that spool is moved to the left direction (L). As the result, the land c is moved backward to the left and the port A gets in the exhaust state. Accordingly, the line 25 to the clutch which is communicated to the port A gets in the exhaust state (clutch C1 disengaged).

Based on the above-mentioned operation, the clutch C2 and the brake B1 are operated so that second-speed state is realized.

(3) operation at the time of third-speed

The solenoid valve SV3 is in the OFF state, therefore, the output line gets in the exhaust state, so that the line to the brake B1 is exhausted. Owing to this, the force for moving the left direction is not affected to the spool of the overdrive select valve 18; however, the line pressure P1 is led-through by the output line of the solenoid valve SV1 which conducts OFF operation; and the line pressure P1 is applied to the left pressure chamber; so that it is moved to the right direction as in the same ways as in the first-speed and the second-speed. Accordingly, the line 24 to the brake B0 is exhausted, and also, the line 23 to the clutch C2 is communicated to the output line of the solenoid valve SV2 so that the line pressure P2 is supplied to it (because the solenoid valve SV2 is in the OFF state).

In the spool of the auxiliary valve 19, the line pressure P2 based on the solenoid valve SV2 in the OFF state is added to the port C so that the land c is pressed to the left direction (the solenoid valve SV3 is in the OFF state so that the hydraulic pressure is not generated), the line pressure P1 which is added to the port of the left pressure chamber and which is based on the solenoid valve SV1 in the OFF state overcomes so that it is moved to the right direction. As the result, the auxiliary valve 29 is communicated between the port A and port B as in the same way as in the first-speed time, so that the line pressure P1 based on the solenoid valve SV1 in the OFF state is supplied to the line 25 to the clutch C1.

Based on the above-mentioned operation, the clutches C1 and C2 are operated so that third-speed state is realized.

(4) operation at the time of fourth-speed

The solenoid valve SV3 is in the OFF state, therefore, the the line 24 which communicated to the output line to the brake B1 is exhausted. Also, the port of the left pressure chamber gets in the exhaust state because the solenoid valve SV1 is in the ON state. Accordingly, the spool of the overdrive select valve 18 is moved to the left direction by the force of the spring S.

Therefore, in the overdrive select valve 18, the ports E and D and the ports C and B are communicated each other. The line pressure P2 based on the solenoid valve SV2 in OFF state is worked on the port D so that the line pressure P2 is supplied to the line 24 to the brake B0 which is communicated to the port E. Also, the hydraulic pressure 12a is supplied to the line 23 to the clutch C2 which is communicated to the port C.

At the spool of the auxiliary valve 19, both of output lines of the solenoid valves SV2 and SV3 are exhausted so that the force of the left pressure chamber to which the line pressure 12a is supplied overcomes and moves to the right direction. As the result, ports A and B are communicated each other and the line to the clutch C1 is exhausted by communicating the outside line of the solenoid valve SV1 in the exhaust state.

Based on the above-mentioned operation, the clutch C2 and the brake B0 are operated so that fourth-speed state is realized.

(5) other operations

<1> in the case when all of solenoid valves SV1, SV2 and SV3 are in ON state

Only in the sole noid valve SV3, the hydraulic pressure is supplied to the output line; and the line pressure P3 is supplied to the brake B1. Furthermore, the spool of the overdrive select valve 18 is moved to the right direction by the above-mentioned line pressure P3. Accordingly, in the same ways as in the cases of one-speed to three-speed the port E is in the exhaust state, the ports C and D are communicated each other, the line 24F to the brake B0 is exhausted and the line 23 to the clutch C2 is exhausted (because the solenoid valve SV2 is in ON state).

The spool of the auxiliary valve 19 is intended to be moved to the left direction by the line pressure P3; however, the output line of the solenoid valve SV2 is in the exhaust state so that it is defeated by the line pressure 12a added to the left pressure chamber and it is moved to the right direction. Therefore, the line 25 of the clutch C1 and the output line of the solenoid valve SV1 are communicated each other; and the line 25 of the clutch C1 is exhausted.

Based on the above-mentioned operation, only the operation of the brake B is conducted so that it is kept in N (neutral) state.

<2> in the case when SV1 and SV2 are in ON state, and SV3 is in OFF state

All of the output lines are in exhaust state so that the spool of the auxiliary valve 19 is moved to the right direction, the spool of the overdrive select valve 18 is compulsively moved to the left direction . Therefore, the line 25, which is communicated to the clutch C1, is communicated to the output line of the solenoid valve SV1 and exhausted. The line 24 communicated to the brake B0 is exhausted at the overdrive select valve 18. On the other hand, the clutch C2 is communicated to the line which supplies the line pressure 12a and operated.

Based on the above-mentioned operation, only the clutch C2 is operated and so that it is kept in N (neutral) state.

<3> in the case when SV2 is in ON state, and SV1 and SV3 are in OFF state

In this case, the hydraulic pressure is supplied to the output line, only in solenoid valve SV1. Accordingly, the spool of the auxiliary valve 19 is moved to the right direction; and the spool of the overdrive select valve 18 is moved to the left direction. Therefore, the line 25, which is communicated to the clutch C1, is communicated the output line of the solenoid valve SV1 and the line pressure P1 is supplied there. However, the rest of engaging elements are exhausted as in the same way as in the case of <2<.

Based on the above-mentioned operation, only the operation of the clutch C1 is conducted so that it is kept in N state.

<4> in the case when SV3 is in ON state, and SV1 and SV2 are in OFF state

In this case, hydraulic pressure is generated at all of the output lines. The solenoid valve SV3 is in ON state so that the line pressure P3 is led-through to the output line and the line pressure P3 is supplied to the brake B1. Also the spool of the overdrive select valve 18 is moved to the right direction. Accordingly, the line communicated to the brake B0 is exhausted. The line 23, which is communicated to the clutch C2, is communicated to the output line of the solenoid valve SV2 and the line pressure P2 is supplied there. (because the solenoid valve SV2 is in OFF state)

The line pressure P3 and the line pressure P2 to the port C overcome the line pressure P12a to the left pressure chamber so that the spool of the auxiliary valve 19 moves to the left direction. As the result, the line 25 to the clutch C1 is exhausted by the auxiliary valve 19. In this case, to the output line of the solenoid valve SV1, the line pressure P1 is supplied. However, the line thereof is shut out by the auxiliary valve 19; so to the overdrive select valve 18, the force of the same direction is worked; so that no change in the movement of the spool is generated. And as the result, it becomes in the engaging state as in the same way as in second-speed time.

Based on the above-mentioned operation, the clutch C2 and the brake B1 are operated so that second-speed state is realized.

According to the operations of the above-mentioned 1 to 4, even if the group of shift devices conduct malfunction, the fail safe function is realized so as no to engage more than three engaging elements at the same time.

In the present invention, as shown in the following Table 2, it is explained that solenoid valves SV1 and SV2 are normal open and SV3 is normal close. However, even if any of SV1, SV2 and SV3 may be changed to normal open or normal close, only the operating table of ON and OFF is changed so that there is no change in the communicating method of each of lines of hydraulic pressure circuits and each of valve shapes.

TABLE 2

|       | SV1 | SV2 | SV3 | C1 | C2 | B0 | B1 |
|-------|-----|-----|-----|----|----|----|----|
| N     | o   | o   | o   |    |    |    | ↑  |
| N     | o   | o   | x   |    | ↑  |    |    |
| N     | x   | c   | x   | ↑  |    |    |    |
| LOW   | x   | o   | o   | ↑  |    |    | ↑  |
| (2nd) | x   | x   | o   |    | ↑  |    | ↑  |
| 2ND   | o   | x   | o   |    | ↑  |    | ↑  |
| 3RD   | x   | x   | x   | ↑  | ↑  |    |    |
| TOP   | o   | x   | x   |    | ↑  | ↑  |    |

↑ represents the operation.

However, when switching from first-speed to second-speed, being different from the electrical switching, the switching of an automatic transmission is conducted mechanically. Therefore, low-second-second-speed is conducted more smoothly compared with the cases in low-second-third-speed or low-top-second-speed; and solenoid valves SV1 and SV2 are normal open and SV3 is normal close (in the case of first-speed-fourth-speed transmission, by limiting the transmission map, the working frequency can be reduced so that there is no practical problem).

Having now fully described the present invention, it will be apparent to one of ordinary skill in the art that many changes and modifications can be made thereto without departing from the spirit or scope of the present invention as set forth herein including the appended claims.

What is claimed is:

1. A circuit for controlling hydraulic pressure of an automatic transmission having a first engaging element being engaged at each time of first-speed and third-speed; a second engaging element being engaged at each time of second-speed, third-speed and fourth-speed and a third and a fourth engaging elements being fixed to members of planetary devices at each time of first-speed, second-speed and fourth-speed; said circuit comprising:

a first solenoid valve, a second solenoid valve and a third solenoid valve which directly control line pressure supplied to the engaging elements at an engaging side in accordance with each speed of said first-speed, second-speed, third-speed and fourth-speed, and at the same time, directly control an exhaust of line pressure of the engaging elements at a disengaging side in accordance with each speed of said first-speed, second-speed, third-speed and fourth-speed, in order to set said each speed of said automatic transmission in response to driving conditions of vehicles; and two switching valves which detect that hydraulic pressure is supplied to an output line of said first solenoid valve or an output line of said third solenoid valve so as to switch third-speed to fourth-speed or fourth-speed to third-speed, and which detect that hydraulic pressure is supplied to an output line of said second solenoid valve or an output line of said third solenoid valve so as to shut out a line which is conducted to said first engaging element being engaged at each time of first-speed and third-speed.

2. A circuit for controlling a hydraulic pressure of an automatic transmission according to claim 1, wherein each of said first shift device, said second shift device and said third shift device comprises a solenoid valve having an input port; an output port; a drain port; a passage which communicates said input port to said output port, and which has a valve chest therein; a valve element formed in said valve chest; a solenoid which varies said valve element to a close-circuit condition in which said valve element is closely brought into contact with a valve seat to open said passage, and which varies said valve element to an open-circuit condition in which said valve element is pull apart from said valve seat to close said passage and said drain port is communicated to said output port.

3. A circuit for controlling a hydraulic pressure of an automatic transmission according to claim 1, wherein said switching means comprises an overdrive select valve and an auxiliary valve; said overdrive select valve which has a spool being selectively moved to the right direction or the left direction by force of a spring and each line pressure from said first shift device, said second shift device and said third shift device, and which controls said hydraulic pressure of one of said engaging elements being engaged at each time of first-speed and third-speed, and the others of said engaging elements being fixed to said members of said planetary devices at each time of first-speed, second-speed and fourth-speed; and said auxiliary valve which has a spool being selectively moved to the right direction or the left direction by line pressure from a primary regulator and line pressure from said first shift device and said second shift device, and which controls said hydraulic pressure of another of said engaging elements being engaged at each time of second-speed, third-speed and fourth-speed.

4. A circuit for controlling hydraulic pressure of an automatic transmission having engaging elements which engage an input shaft with members of planetary devices or disengage said input shaft from said members of said planetary devices by supplying or exhausting hydraulic pressure; one of said engaging elements being engaged at each time of first-speed and third-speed; another of said engaging elements being engaged at each time of second-speed, third-speed and fourth-speed and the others of said engaging elements being fixed to said members of said planetary devices at each time of first-speed, second-speed and fourth-speed; said circuit comprising:

a first shift device, a second shift device and a third shift device which make line pressure lead-through by selecting the predetermined combination of supply and exhaust of said hydraulic pressure in accordance with each speed of said first-speed, second-speed, third-speed and fourth-speed, in order to set said each speed of said automatic transmission in response to driving conditions of vehicles; and a switching means which detects that hydraulic pressure is supplied to an ouput line of said first shift device or an output line of said third shift device so as to switch third-speed to fourth-speed or fourth-speed to third-speed, and which detects that hydraulic pressure is supplied to an output line of said second shift device or an output line of said third shift device so as to shut out a line which is conducted to said one of said first engaging elements being engaged at each time of first-speed and third-speed;

wherein said switching means comprises an overdrive select valve and an auxiliary valve; said overdrive select valve which has a spool being selectively moved to the right direction or the left direction by force of a spring and each line pressure from said first shift device, said second shift device and said third shift device, and which control said hydraulic pressure of one of said engaging elements being engaged at each time of first-speed and third-speed, and the others of said engaging elements being fixed to said members of said planetary devices at each time of first-speed, second-speed and fourth-speed; and said auxiliary valve which has a spool being selectively moved to the right direction or the left direction by line pressure from a primary regulator and line pressure from said first shift device and said second shift device, and which controls said hydraulic pressure of another of said engaging elements being engaged at each time of second-speed, third-speed and fourth-speed.

* * * * *